(12) United States Patent
Patel et al.

(10) Patent No.: US 11,062,698 B2
(45) Date of Patent: Jul. 13, 2021

(54) IMAGE-BASED APPROACHES TO IDENTIFYING THE SOURCE OF AUDIO DATA

(71) Applicant: VocaliD, INC., Belmont, MA (US)

(72) Inventors: Rupal Patel, Belmont, MA (US); Geoffrey S Meltzner, Natick, MA (US); Markus Toman, Vienna (AT)

(73) Assignee: VocaliD, INC., Belmont, MA (US)

( * ) Notice: Subject to any disclaimer, the term of this patent is extended or adjusted under 35 U.S.C. 154(b) by 0 days.

(21) Appl. No.: 16/662,467

(22) Filed: Oct. 24, 2019

(65) Prior Publication Data

US 2020/0184955 A1 Jun. 11, 2020

Related U.S. Application Data

(63) Continuation of application No. 16/213,388, filed on Dec. 7, 2018, now Pat. No. 10,504,504.

(51) Int. Cl.
| | |
|---|---|
| *G10L 15/00* | (2013.01) |
| *G10L 15/06* | (2013.01) |
| *G10L 15/22* | (2006.01) |
| *G10L 25/18* | (2013.01) |
| *G10L 25/24* | (2013.01) |

(52) U.S. Cl.
CPC ............ *G10L 15/063* (2013.01); *G10L 15/22* (2013.01); *G10L 25/18* (2013.01); *G10L 25/24* (2013.01)

(58) Field of Classification Search
None
See application file for complete search history.

(56) References Cited

U.S. PATENT DOCUMENTS

| | | | | |
|---|---|---|---|---|
| 7,549,052 B2* | 6/2009 | Haitsma | ............ | G06K 9/00744 |
| | | | | 713/180 |
| 8,560,583 B2* | 10/2013 | Mallinson | .......... | H04N 21/4788 |
| | | | | 707/802 |
| 8,853,516 B2 | 10/2014 | Arimoto et al. | | |
| 8,874,575 B2* | 10/2014 | Mallinson | ............. | G06F 16/433 |
| | | | | 707/736 |
| 9,113,217 B2* | 8/2015 | Mallinson | ............... | G06Q 30/02 |
| 9,256,601 B2* | 2/2016 | Mallinson | .......... | H04N 21/4788 |
| 9,264,785 B2* | 2/2016 | Mallinson | ............. | G06F 16/433 |
| 9,691,183 B2* | 6/2017 | Trainor | ................ | H04L 67/2804 |
| 9,858,340 B1 | 1/2018 | Frey et al. | | |
| 9,998,847 B2* | 6/2018 | Norris | ..................... | H04S 1/007 |
| 10,108,709 B1 | 10/2018 | Frey et al. | | |

(Continued)

OTHER PUBLICATIONS

U.S. Notice of Allowance dated Aug. 1, 2019 issued in U.S. Appl. No. 16/213,388.

*Primary Examiner* — Satwant K Singh
(74) *Attorney, Agent, or Firm* — Platinum Intellectual Property LLP

(57) ABSTRACT

Image-based machine learning approaches are used to classify audio data, such as speech data as authentic or otherwise. For example, audio data can be obtained and a visual representation of the audio data can be generated. The visual representation can include, for example, an image such as a spectrogram or other visual or electronic representation of the audio data. Before processing the image, the audio data and/or image may undergo various preprocessing techniques. Thereafter, the image representation of the audio data can be analyzed using a trained model to classify the audio data as authentic or otherwise.

20 Claims, 11 Drawing Sheets

(56) References Cited

U.S. PATENT DOCUMENTS

2011/0071831 A1     3/2011   Garcia et al.
2015/0206538 A1     7/2015   Aviles-Casco et al.
2018/0227697 A1*   8/2018   Norris .................... H04S 7/304

* cited by examiner

IMAGE-BASED APPROACHES TO IDENTIFYING THE SOURCE OF AUDIO DATA

CROSS-REFERENCES TO RELATED APPLICATIONS

This application is a continuation of U.S. application Ser. No. 16/213,388, entitled "IMAGE-BASED APPROACHES TO CLASSIFYING AUDIO DATA," filed Dec. 8, 2018 which the full disclosure of this application is incorporated herein by reference for all purposes.

BACKGROUND

As an increasing number of applications and services are made available through voice interfaces, speech technology is increasingly being used to classify audio data as authentic or otherwise.

Advances in speech synthesis are increasing as well. For example, users of voice interfaces can converse with human-sounding artificial intelligence (AI) to schedule appointments, make reservations, add items to a shopping cart, and so on. In many situations, speech technology is being adopted across financial, government, health and educational sectors for its implications on security and customer experience.

While advances in speech technology have numerous beneficial applications, this confluence of improvements in speech synthesis and the pervasiveness of voice data as a mode of interaction creates an opportunity for speech-based fraud, for financial gain, dissemination of propaganda, identity fraud, and more.

Various approaches have been used to classify speech data. In many cases, however, these approaches rely on a selection of top down acoustic features that differ between authentic and inauthentic speech data. This approach can be time-consuming and may not be able to keep pace with the rapid developments in speech synthesis or at least may provide less than optimal classification results. This is particularly troubling as voice interfaces are increasingly being deployed in environments where sensitive information is exchanged. A need exists, therefore, for systems, methods, and devices that overcome this disadvantage.

DETAILED DESCRIPTION

Figure 1A:
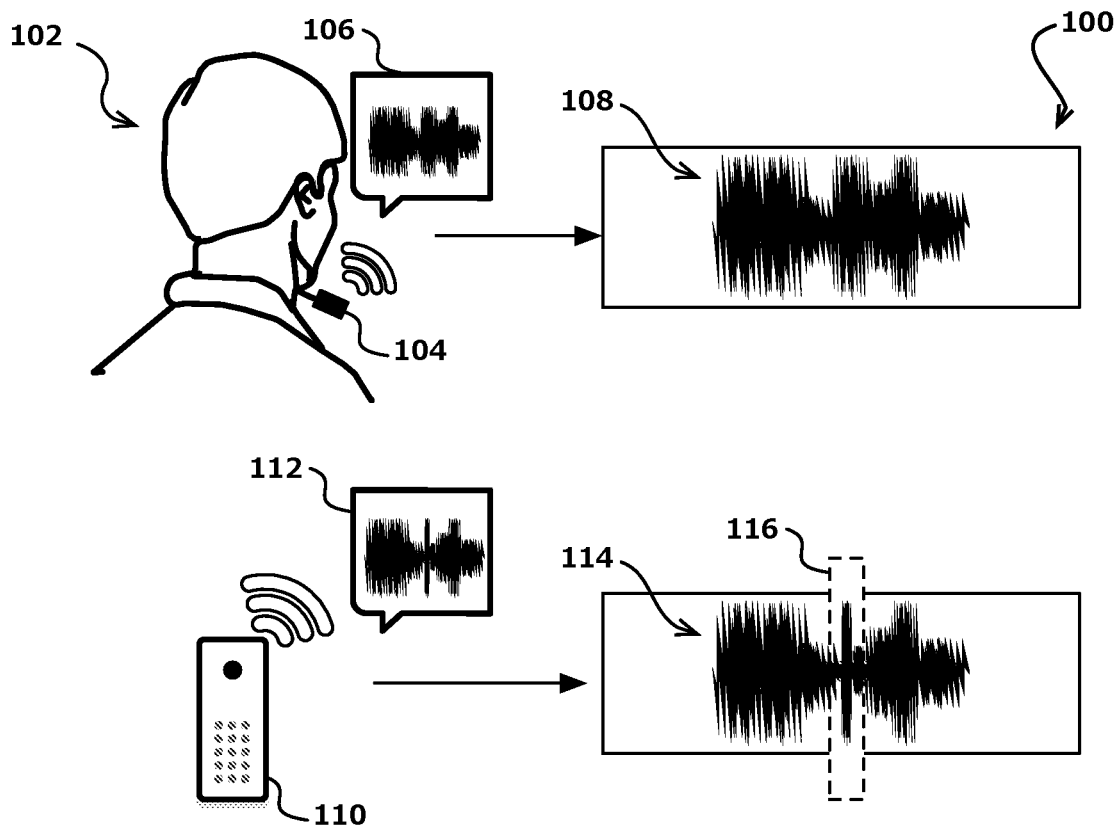
FIGS. 1A and 1B illustrate an example situation of classifying audio data in accordance with an embodiment.

Systems and methods in accordance with various embodiments of the present disclosure may overcome one or more of the foregoing or other deficiencies experienced in conventional approaches for processing audio data by an electronic device. In particular, various embodiments utilize an image-based machine learning approach to classify audio data as authentic or otherwise from images of audio data received from a computing device (e.g., telephone, a mobile phone, tablet computer, etc.) or other electronic devices.

For example, a set of images of input audio data can be determined, where individual images allow for various visual attributes to be identified that are likely represented in those images. The images can be designated as part of a training set for training a model such as a neural network or other machine learning model for attributes associated with a category of audio data (e.g., authentic, inauthentic speech categories). The images in the set can be analyzed using a classification process or other such process to determine whether audio data such as speech data represented in those images corresponds to a determined category and includes particular attributes, or types of attributes, for which a model such as a neural network is to be trained. For example, the images in the set can be analyzed to determine one or more segments of speech data that likely includes a representation of an attribute. Once determined, the image segment(s) can be analyzed to extract features (or a feature vector) that can be used to train classification layers of a neural network to classify segments of speech data for a particular category of speech, such as authentic, inauthentic, and/or a particular category of inauthentic speech. The neural network can be trained to determine a score representative of a level of authenticity (or in some embodiments a level of inauthenticity) that can be used to classify the speech data as authentic or otherwise.

Once the trained network or other trained model is obtained, an authenticity or other confidence score can be determined for input audio data (e.g. speech data), and the authenticity score can be used to determine whether the speech data is authentic. For example, speech data can be captured by a computing device, where the speech data can be captured at an audio input component of the device, such as a microphone. In certain embodiments, the microphone can be coupled to an analog-to-digital (A/D) converter. In this example, the microphone can be configured to receive the speech data or other audio input data while the A/D converter can sample the speech data to convert the signal into a digital audio data suitable for further processing. In certain embodiments, the speech data can be generated using one or more speech synthesis techniques or other such approaches. The generated speech data can be obtained from a provider of such speech data or other entity.

In any situation, a visual representation of the speech data can be generated. The visual representation can include, for example, an image such as a spectrogram or other visual or electronic representation of the speech data. The images in various embodiments can include visual representations of analog and/or digital audio data. In an embodiment, before processing an image, the speech data and/or image may undergo various preprocessing techniques. The preprocessing techniques can be executed on the computing device, at a server, some other component or server, or a combination thereof. For example, a preprocessing component can implement one or more signal processing algorithms to adjust a sampling rate of the speech data, remove, alter, and/or add audio data to the speech data, etc. In another example, the preprocessing component can transform the speech data from the time domain into another domain, e.g., the frequency domain to generate one or more digital speech segments, where each segment can correspond to a determined or variable window. The speech segments can be representative of a set of speech samples that occur sequentially in time, where each speech sample can be identified by a frequency distribution or other speech data identifier. Further, a size of each of the windows can correspond to a respective portion of the speech data, where the size of individual windows can be based on a duration of a vowel phoneme, other phoneme, or any other unit of language, or some other characteristic of the speech data.

In various embodiments, the preprocessing component can implement image processing algorithms to, for example, generate a spectral representation of the speech data, focus on different aspects of the spectral representation (e.g., narrowband, wideband focus), select or crop regions of the image to remove irrelevant portions of the image and to highlight relevant portions, etc. The relevant regions can be binarized, and, thereafter, provided or communicated to a server executing at least the classification engine. Alternatively, in accordance with at least one embodiment, a grey scale image, color image or any other image (selected/cropped or otherwise not selected/cropped) can be communicated to the server (or remain on the portable computing device) for further processing.

The visual representation of the speech data can be analyzed using the trained network to associate an authenticity score with one or more segments of the speech data, where the authenticity or confidence score quantifies a likelihood that a segment of speech data is authentic. In an embodiment, the authenticity scores can be compared to authenticity thresholds. In the situation where an authenticity score satisfies an authenticity threshold, the speech data can be classified as authentic speech. In the situation where the authenticity score does not satisfy the authenticity threshold, the speech data can be classified as inauthentic speech. In accordance with various embodiments, the thresholds can be updated or otherwise tuned for particular types of inauthentic speech over time and can be used to classify speech data and/or segments of the speech data as a type of inauthentic speech.

In accordance with various embodiments, instructions for causing a computer system to classify speech data in accordance with the present disclosure may be embodied on a computer-readable medium. Further, in accordance with various embodiments, a system for classifying speech data is provided. For example, in accordance with an embodiment, a backend system may classify speech data obtained from one or more sources.

Embodiments provide a variety of advantages. For example, approaches in accordance with various embodiments improve the operation and performance of the computing device(s) on which they are implemented and with which they communicate wirelessly by, among other advantages, minimizing malicious or otherwise unauthorized access to sensitive information. For example, such systems can improve resource usage using machine learning techniques by dynamically tailoring audio classification approaches to current and evolving inauthentic audio data. Further, such a system can improve voice systems and other such systems by identifying inauthentic speech data. Various other applications, processes, and uses are presented below with respect to the various embodiments, each of which improves the operation and performance of the computing device(s) on which they are implemented.

Figure 1B:
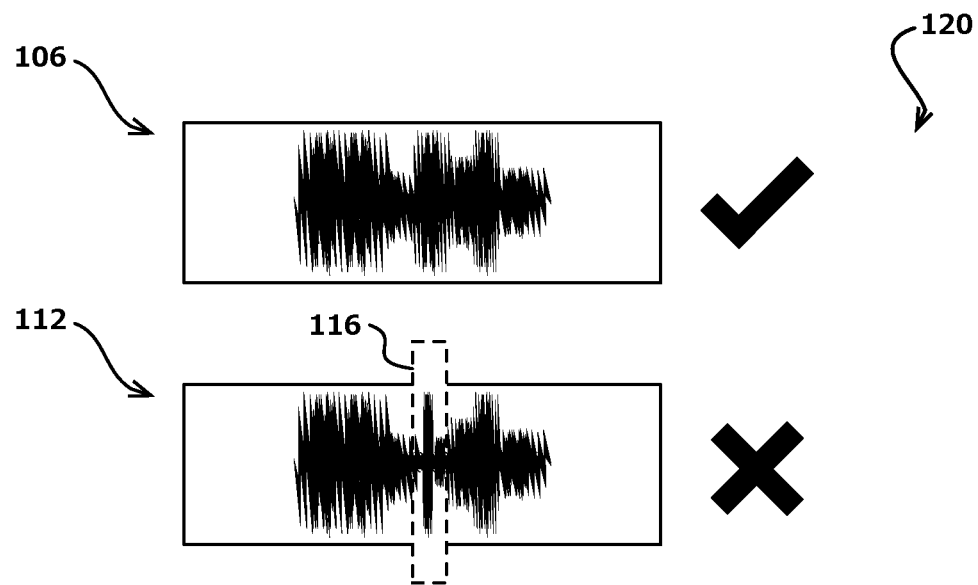

FIGS. 1A-1B illustrate an example of classifying audio data in accordance with various embodiments. As shown in example 100 of FIG. 1A, user 102 is talking into a headset 104. In the illustrated embodiment, the user is talking with a person or automated voice system to access, for example, financial records. Although a headset is shown, it should be understood that any electronic device capable of receiving and/or processing audio data can be used in accordance with various embodiments discussed herein, where the devices can include, for example, mobile phones, tablets, microphones, notebook computers, personal data assistants, among others. The headset, in this example, can include at least one microphone and/or speaker. The headset can further include one or more internal processing components (not shown), such as an analog-to-digital (A/D) converter, an audio processing engine, an audio classification engine, a time domain conversion module, etc. Further components and software both related and not related to classification of the audio data, according to various embodiments, may also be included in the headset or otherwise in communication with the headset.

Also shown in FIG. 1A is audio communications device 110. Audio communication devices 110 can include, for example, portable computing devices, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, or any device having a microphone, speaker, or other component(s) or software configured to analyze, generate, and communicate audio data in the frequency range in which humans communicate or any detectable frequency range. An application executing on audio communication devices 110 or otherwise in communication with audio communications device 110, can analyze input audio data to determine an appropriate response. For example, audio communication devices 110 can respond to questions, ask questions, and generally appear to converse with a person or automated voice system.

User 102, in this example, is speaking with a human or artificial intelligence-based operator to, e.g., check on their finances and/or transfer money, etc. Similarly, audio communications device 110 is speaking with a human or artificial intelligence-based operator to check on and/or transfer money. However, audio communications device 110 is using various speech synthesis techniques to generate audio data 112 to match audio data 106 from user 102. As described, while advances in speech technology have numerous beneficial applications, inauthentic audio data, such as in this example, can be used for speech-based fraud. Accordingly, in accordance with various embodiments, an image-based machine learning approach can be used to classify audio data as authentic or otherwise from images of the audio data.

For example, audio data 106 from user 102 and audio data 112 from audio communications device 110 can be received at an audio classifying system (not shown). In this example, an A/D converter can sample audio data 106 and audio data 112 to convert the audio data into digital audio data 108 and 114 suitable for further processing. For example, the audio classifying system can transform audio data 106 and 112 from the time domain into the frequency domain using an appropriate algorithm and can generate one or more digital audio data segments, where each segment can correspond to a determined or variable segment size.

However, it should be noted that in various embodiments audio data 106 and 112 is not received at an A/D and instead is otherwise segmented or further processed in accordance with the various embodiments described herein. For example, this can include segmenting or in various embodiments bypassing segmentation and processing the audio data (analog and/or digital) in accordance with embodiments described herein.

In any situation, determining the size of each segment can be accomplished in any number of ways. For example, fixed length segments can be used based at least in part on characteristics of human speech, such as the duration of certain phonemes. In various other embodiments, wavelet decomposition can be used to determine the size of each segments.

A visual representation of audio data 108 and 114 can be generated. In accordance with various embodiments, a visual representation of audio data 106 and 112 can be generated instead. In certain embodiments, generating a visual representation can include generating a visual representation of analog audio data and digital audio data. For example, a visual representation of audio data 108 and 112. In any situation, a visual representation can include, for example, an image such as a spectrogram or other visual or electronic representation of the audio data. In various embodiments, before processing the visual representations, the audio data and/or visual representations may undergo various preprocessing techniques. The preprocessing methods can be executed locally, at a server, some other component or server, or a combination thereof.

In this example, the visual presentations of audio data 108 and 114 can be analyzed using a trained model to classify audio data 106 and 112 as authentic or otherwise. For example, the trained model can identify inauthentic audio data or audio segments, such as audio segment 116 in audio data 114. In an embodiment, the trained model can associate an authenticity score with one or more segments of the audio data which in some embodiments may include the entire audio data. In an embodiment, the authenticity scores can be compared to authenticity thresholds. In the situation where an authenticity score satisfies an authenticity threshold, the audio data can be classified as authentic. In the situation where an authenticity score fails to satisfy the authenticity threshold, for example, the authenticity score is less than an authenticity threshold or does not meet the authenticity threshold by a determined amount, the audio data can be classified as inauthentic. As shown in example 120 of FIG. 1B, audio data 106 associated with user 102 is classified as authentic and audio data 112 associated with audio communications device 110 is classified as inauthentic. In this situation, for example, user 102 may be granted authorization to complete their intended task while authorization may be declined to audio communications device 110 or at least further authentication may be required.

Figure 2:
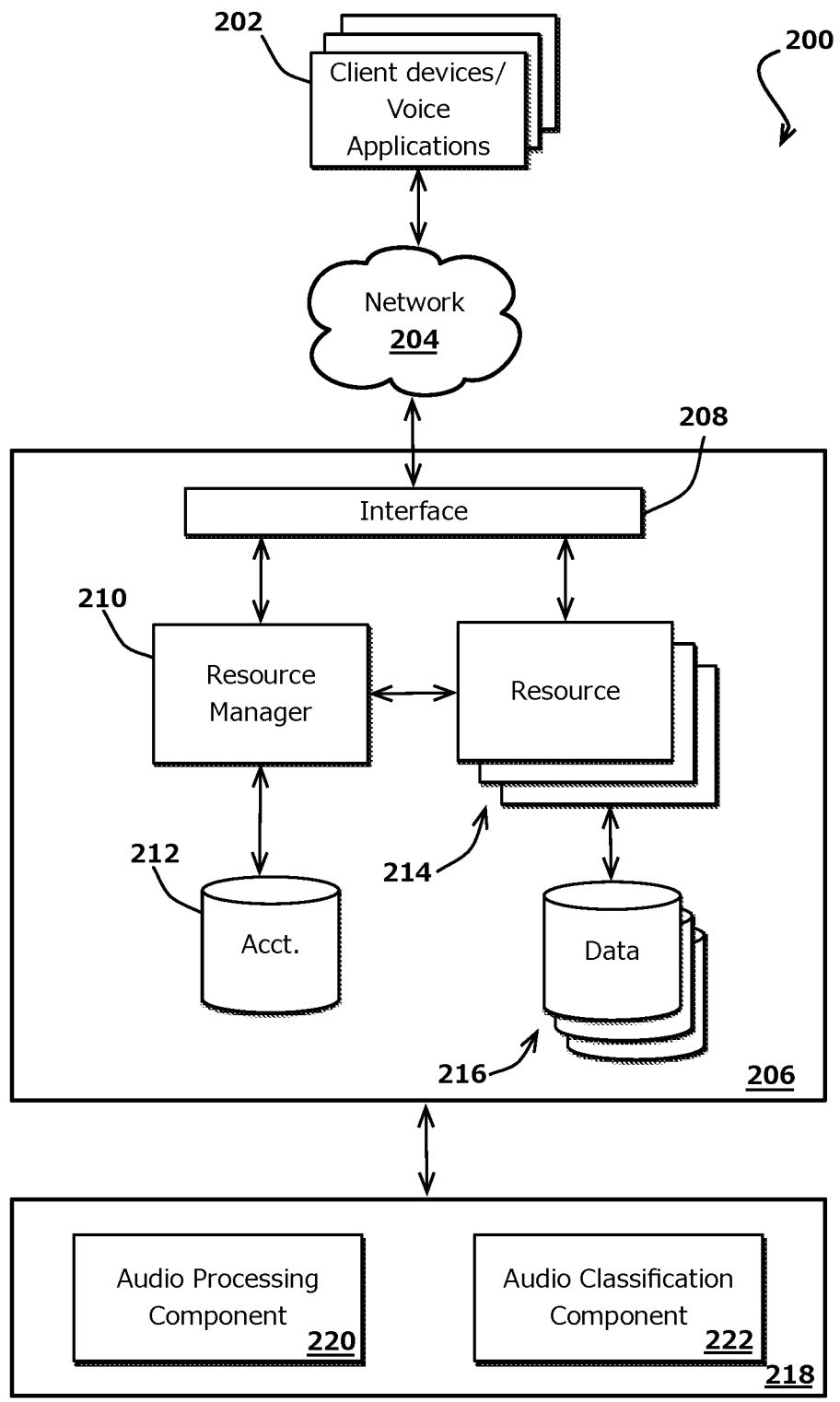
FIG. 2 illustrates an example environment in which aspects of the various embodiments can be implemented.

FIG. 2 illustrates an example environment 200 in which aspects of the various embodiments can be implemented. In this example, a user is able to utilize a client device 202 and/or a voice application to communicate across at least one network 204 with a resource provider environment 206. The client device 202 can include any appropriate electronic device operable to send and receive requests, messages, or other such information over an appropriate network and convey information back to a user of the device. Examples of such client devices 202 include personal computers, tablet computers, smartphones, notebook computers, and the like.

The network(s) 204 can include any appropriate network, including an intranet, the Internet, a cellular network, a local area network (LAN), or any other such network or combination, and communication over the network can be enabled via wired and/or wireless connections.

The resource provider environment 206 can include any appropriate components for receiving requests and returning information or performing actions in response to those requests. As an example, resource provider environment 206 might include Web servers and/or application servers for receiving and processing requests, then returning authentication scores, data, Web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, resource provider environment 206 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that detailed description of the entire process, and explanation of all possible components, will not be discussed in detail herein. In this example, resource provider environment 206 includes a plurality of resources 214 of one or more types. These types can include, for example, application servers operable to process instructions provided by a user or database servers operable to process data stored in one or more data stores 216 in response to a user request.

In various embodiments, resource provider environment 206 may include various types of resources that can be utilized for processing audio data, such as speech data and the like. In this example, resource provider environment 206 includes a management component (not shown) operable to manage an authentication system. The management component may be hosted on multiple server computers and/or distributed across multiple systems. Additionally, the components may be implemented using any number of different computers and/or systems. Thus, the components may be separated into multiple services and/or over multiple different systems to perform the functionality described herein.

Resources 214 can further include one or more voice appliances. A voice appliance can accept connections from third-party devices. A voice appliance can be a computing device and/or software configured to obtain audio data. For example, in an embodiment, individual voice appliances can receive audio data from a person and/or other computing devices.

In various embodiments, the resources 214 can take the form of servers (e.g., application servers or data servers) and/or components installed in those servers and/or various other computing assets. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 202 that needs to access resources of the provider environment 206, for example, to manage the authentication system, implemented as one or more services to which the application has subscribed, can submit a request that is received to interface layer 208 of the provider environment 206. The interface layer 208 can include application programming interfaces (APIs) or other exposed interfaces enabling a user to submit requests, such as Web service requests, to the provider environment 206. Interface layer 208 in this example can also include other components as well, such as at least one Web server, routing components, load balancers, and the like. When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one data store 212 in the resource provider environment 206. The resource manager can in some embodiments authenticate the user in accordance with embodiments described herein based on voice data provided by the user.

An interface layer 208 in at least one embodiment includes a scalable set of customer-facing servers that can provide the various APIs and return the appropriate responses based on the API specifications. Interface layer 208 also can include at least one API service layer that in one embodiment consists of stateless, replicated servers which process the externally-facing customer APIs. The interface layer can be responsible for Web service front-end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

A host machine 218 in at least one embodiment can host the authentication system and can include audio processing component 220 and audio classification component 222. In at least one embodiment, audio processing component 220 and audio classification component 222 can utilize a machine learning-based approach to classify audio data (e.g., speech data) as authentic or otherwise from images of speech data.

As mentioned, however, conventional approaches to classifying speech, if performed at all, typically rely on a selection of top down acoustic features that differ between authentic and inauthentic speech data. The selection of acoustic features can be time-consuming and such an approach may not keep pace with the rapid developments in speech synthesis. Further, this approach can be susceptible to human error such that the selection of acoustic features provides less than optimal classification results. Accordingly, in accordance with various embodiments, audio data, e.g., authentic and inauthentic speech data can be obtained, and a visual representation of the speech data can be generated. The visual representation can include, for example, an image such as a spectrogram or other visual or electronic representation of the spectrum of the speech data. In various embodiments, before processing the image, the speech data and/or image may undergo various preprocessing techniques. The visual representation of the speech data can be analyzed using a trained network to associate an authenticity score with one or more segments of the speech data. In an embodiment, the authenticity scores can be compared to authenticity thresholds. In the situation where an authenticity score satisfies an authenticity threshold, the speech data can be classified as authentic speech. In the situation where the authenticity score does not satisfy the authenticity threshold, the speech data can be classified as inauthentic speech.

It should be noted that although host machine 218 is shown outside the provider environment, in accordance with various embodiments, audio processing component 220 and audio classification component 222 can both be included in provider environment 206, while in other embodiments, one or the other can be included in the provider environment.

Figure 3A:
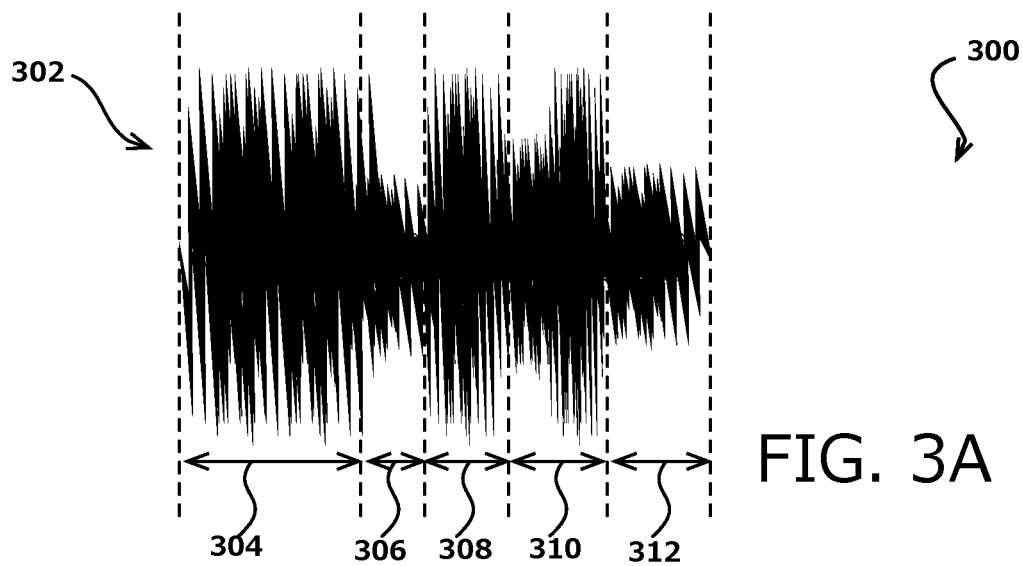
FIGS. 3A, 3B, and 3C illustrate an example implementation for processing audio data in accordance with various embodiments.
Figure 3B:
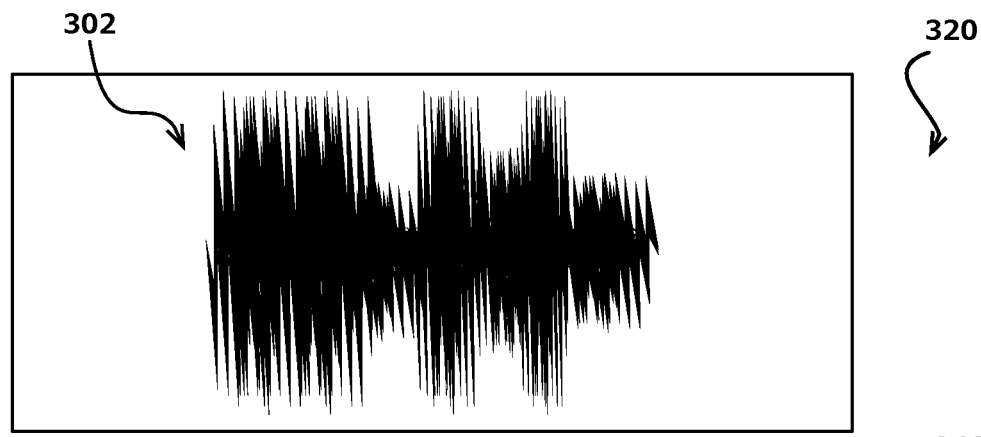
Figure 3C:
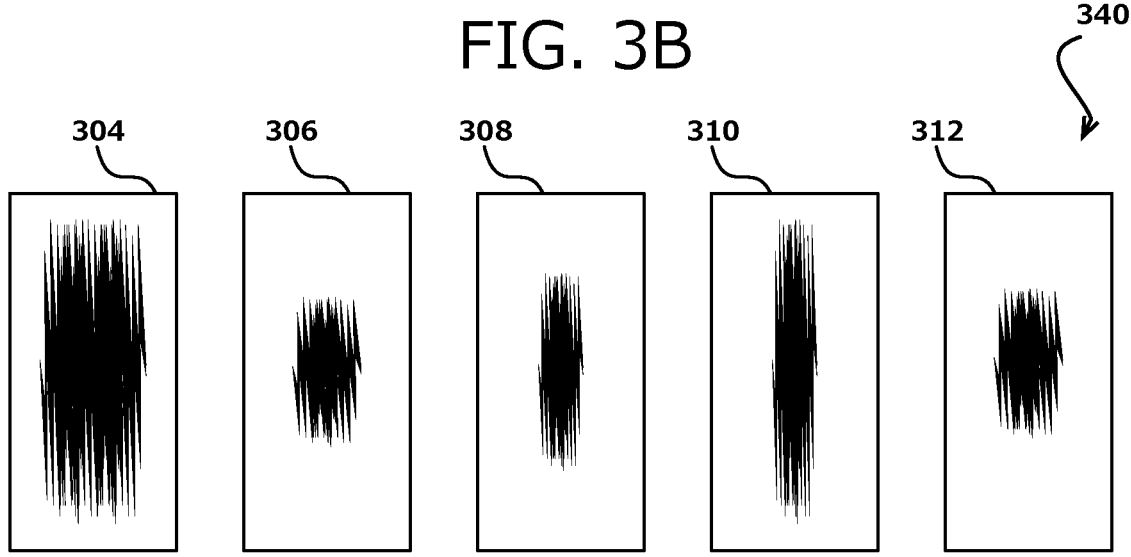

FIGS. 3A, 3B, and 3C illustrate an example implementation for processing audio data, such as may correspond to speech data, in accordance with various embodiments. As used herein, audio data can include human speech, for example, natural language utterances. Human speech in various embodiments may be referred to as speech data. In certain embodiments, audio data and speech data may be used interchangeably. As further used herein, inauthentic audio data can include inauthentic speech data. In accordance with various embodiments, inauthentic speech data can include machine generated speech data, human speech that has been manipulated using, for example, using electronic and/or mechanical devices, or a combination thereof. As shown in example 300 of FIG. 3A, an input audio data, such as the speech signal "This is Mike. I'd like to cast my vote" described with reference to FIG. 1A, is received. The input audio data can be obtained by a microphone of a computing device, downloaded, acquired as part of a stream of data, etc. An A/D converter can sample the input audio data to convert the signal into digital audio data 302. In accordance with an embodiment, an audio processing engine of the computing device, or remote the computing device, can be configured to decompose the digital audio input signal into one or more digital audio segments 304-312, where individual audio segments can correspond to a particular window of time or section of the audio data. In some embodiments, certain detected amplitudes of the digital audio input signal can be used to segment the audio data. For example, detected amplitudes can be used to determine when something spoken begins and when something spoken ends, and the 'begin' and 'end' determination can be applied to segment the digital audio input signal. In another example, the speech segments can be identified by a frequency distribution or other speech data identifier. For example, each of the windows of time can correspond to a respective portion of the speech data, where the size of individual windows can be based on a duration a vowel phoneme, other phonemes, or any other unit of language.

Audio data 302 can be analyzed in its entirety, or individual audio segments of audio data 302 can be analyzed. Example 320 of FIG. 3B illustrates the situation where audio data 302 is analyzed in its entirety. In this example, a visual representation of audio data 302 can be generated. The visual representation can include, for example, an image such as a spectrogram or other visual or electronic representation of the spectrum of the speech data. The visual representation of audio data 302 can be analyzed using a trained model to associate an authenticity score with audio data 302. The authenticity score can be compared to an authenticity threshold. In the situation where the authenticity score satisfies the authenticity threshold, audio data 302 can be classified as authentic. In the situation where the authenticity score does not satisfy the authenticity threshold, the audio data 302 can be classified as inauthentic.

Example 340 of FIG. 3C illustrates the situation where audio segments 304-312 are individually analyzed to classify audio data 302 as authentic speech and/or individual audio segments. In this example, a visual representation of audio segments 304-312 can be generated. As described, the visual representation can include, for example, an image such as a spectrogram or other visual or electronic representation of the spectrum of the audio data segments. The visual representations of audio segments 304-312 can be analyzed using a trained network to associate an authenticity score with individual audio segments. In an embodiment, the authenticity scores can be compared to authenticity thresholds. Based on the comparison, individual audio segments can be classified as authentic or otherwise.

In some embodiments, rather than classifying a segment as authentic or otherwise, the speech segments can be associated with respective authenticity scores. In any situation—classifying as authentic or otherwise, associated individual segments with an authenticity score, or a combination thereof, an authentication component can make a determination of the authenticity of the speech data based on a combination of the authenticity scores and/or classifications. For example, a weighted combination of authenticity scores or classifications of the segments of the speech data can be used to determine whether the audio data, in its entirety, is authentic or otherwise.

It should be noted that the examples described with reference to FIGS. 3A-3B are described with reference to the frequency domain, and in various other embodiments, a similar process can be accomplished in the time domain in accordance with the various embodiments described herein.

Figure 4:
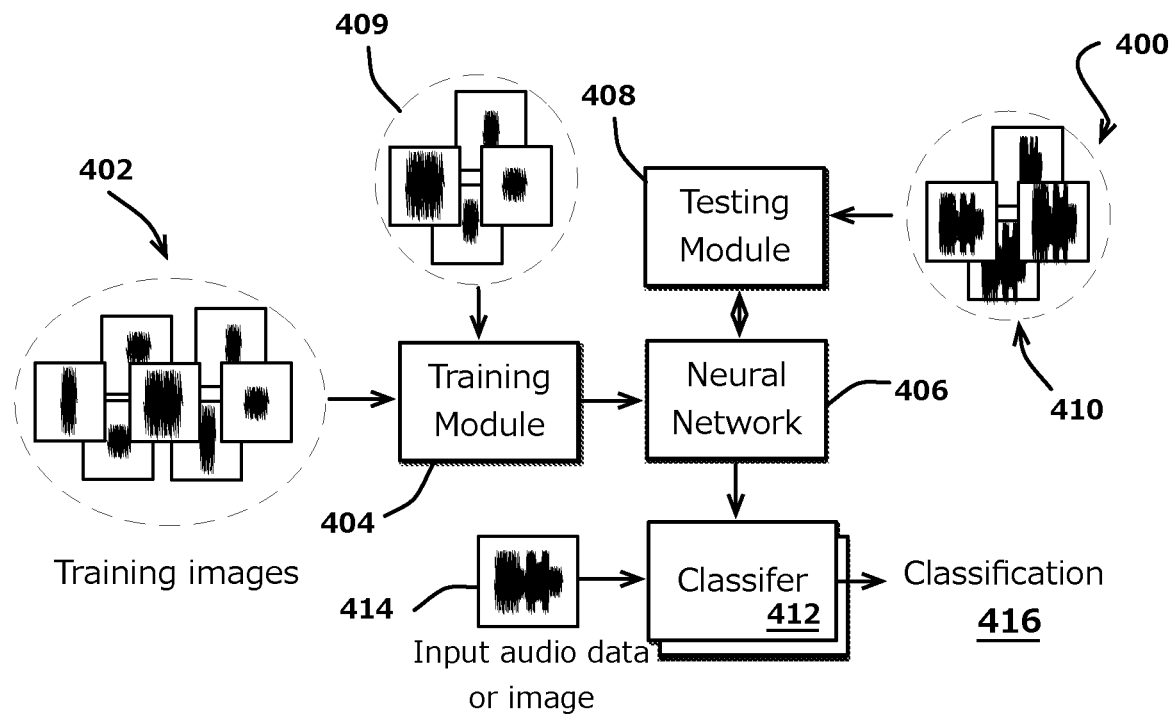
FIG. 4 illustrates an example approach to training a model to identify audio data for a particular classification that can be utilized in accordance with various embodiments.

FIG. 4 illustrates an example classification pipeline 400 that can be utilized in accordance with various embodiments. In this example, a set of images 402 and 409 is obtained that can be used to train one or more neural networks 406 to classify audio data represented in those images. The images can be generated from one or more sources of authentic and inauthentic audio data, such as from a provider of audio data, the Internet, an audio generator, users of an application or service, publicly available audio data (e.g., LibriVox, ASVSpoof15, etc.), and the like. The images can include visual representations of analog and/or digital audio data.

In any situation, in order to function as training data for one or more models or neural networks, or other such machine learning algorithms, at least some of the images will include (or be associated with) data that indicates a type or classification of audio represented in each image. For example, audio data including speech data can be classified as authentic or inauthentic speech. Inauthentic speech can be associated with a category of inauthentic speech such as concatenative synthetic speech (Unit Selection), HMM based parametric synthesis, deep neural network based parametric synthesis, recurrent neural network based parametric synthesis, end-to-end synthesizers including Google Wavenet, Tacotron+wavenet, Tacotron+WaveRNN, etc. The classifications in at least some embodiments will be selected from a set of classifications, or sub-classifications, used to identify various types of speech. In various embodiments, inauthentic speech can include portions of authentic speech. In various embodiments, the inauthentic speech is a modified version of authentic speech, such as a modification of tone of the authentic speech.

In some embodiments the set of images will be analyzed to determine which images include data sufficient to identify a type of speech represented in each of those images, and those images can be considered a training set to be used to train the neural networks. In at least some embodiments there is one neural network or classification layer of such networks including, for example, a multi-class classifier trained for each category of speech data, with multiple types of classifications of that type of speech data being possible outcomes from the network. In some embodiments a portion of the training set will be retained as a testing set 410 to use to test the accuracy of the trained neural network. In this example, the training images are accessible to a training module 404 which can feed the images to a neural network 406 in order to train the network. As mentioned, the image and classification data will be fed to the neural network so the neural network can learn features of items associated with different classifications of speech. The network can then learn various combinations or relations of features for different classifications, such that when input speech data is processed with the trained neural network, the network can recognize the features and output the appropriate classification, although various other approaches can be utilized as well within the scope of the various embodiments.

In some embodiments, the training images 402 are to be used as training data for a convolutional recurrent neural network, deep neural network, or other type of neural network or model. As mentioned, the images can be classified, either when provided or through a classification analysis, to determine a primary classification, such as authentic or inauthentic speech. Various other images provided by third party sources or generated from speech data provided the third parties can be used for training as well as discussed and suggested elsewhere herein. The neural network can be trained using some or all of the designated training data. Once at least the initial training has completed, a testing module 408 can utilize the testing images 410 to test the trained neural network. Since the testing images already include classification data, such as data operable to label, identify, or otherwise indicate ground truth, the classifications generated by the neural network can be compared against that data to determine the accuracy of the neural network, both overall and for different categories of items. The testing images can also be used to further train the neural network. The results can be analyzed and if the results are acceptable, such as where the accuracy at least meets a minimum accuracy threshold for some or all of the classifications, the neural network can be provided to a classifier 412 that is able to accept query images 414 from various sources, such as customers or end users, and generate classifications 416 for speech represented in those images. The query images generated from speech data might also come from the provider itself. As described herein, such an approach can be used for a number of different purposes, such as part of an authentication process.

In some embodiments, deep neural networks can be trained using a set of training images exhibiting different classifications of speech data and including information detailing those classifications. In other embodiments, generative adversarial networks (GANs) can be used that do not require the data seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional recurrent neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

In order for the neural network to provide sufficient accuracy, the neural network will in many cases need to process enough images of each type or classification of speech data to be able to accurately recognize those types of speech. For inauthentic speech that can have many different sub-categories or sub-classifications, this may require a very large set of training images. As the number of categories increases, or the number of sub-category divisions increases, the total number of images needed to train the neural network will in most cases increase as well. In order to ensure accuracy, the training images will need to include an appropriate classification for the speech data represented. Accordingly, approaches in accordance with various embodiments can attempt to generate or "synthesize" training images from speech data for use in training one or more neural networks or other machine learning algorithms. Such approaches can modify the available data in a way where it can still be identified with the same label. This can include, for example, shifting the audio in time, scaling the amplitude, and adding noise. Such an approach can help to provide more training data.

Figure 5:
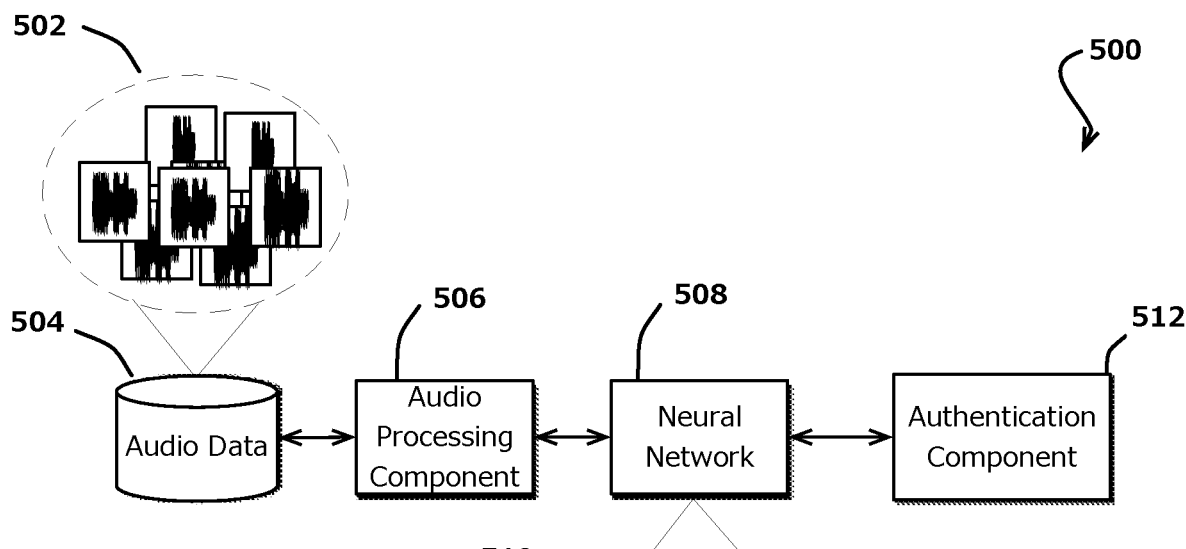
FIG. 5 illustrates an example approach to utilizing a trained model to classify an image of audio data that can be utilized in accordance with various embodiments.

Once the neural network is trained, the neural network can be used to classify speech data as authentic or otherwise from images of speech data, as illustrated in example 500 of FIG. 5. In this example, speech data 502 can be obtained and stored in data store 504. In accordance with various embodiments, obtaining the speech data can include downloading the speech data, receiving a stream of the speech data, capturing the speech data at an audio input component of the device, such as a microphone coupled to an analog-to-digital (A/D) converter, among other such approaches. A visual representation of the speech data can be generated using speech processing component 506. The images can include visual representations of analog and/or digital audio data. Speech processing component 506 can implement one or more signal processing algorithms to adjust a sampling rate of the speech data, remove, alter, and/or add audio data to the speech data, etc. In another example, speech processing component 506 can transform the speech data from the time domain into another domain, e.g., the frequency domain to generate one or more digital speech segments, where each segment can correspond to a determined or variable window of time. The speech segments can be representative of a set of speech samples that occur sequentially in time, where each speech sample can be identified by a frequency distribution or other speech data identifier. Further, each of the windows of time can correspond to a respective portion of the speech data, where the size of individual windows can be based on a duration a vowel phoneme, other phoneme, or any other unit of language.

In various embodiments, the preprocessing component can implement image processing algorithms to, for example, generate a spectral representation of the speech data, focus on different aspects of the spectral representation (e.g., narrowband, wideband focus), select or crop regions of the image to remove irrelevant portions of the image and to highlight relevant portions, etc. The relevant regions can be binarized, and, thereafter, provided or communicated to a server executing at least the classification engine. Alternatively, in accordance with at least one embodiment, a grey scale image, color image or any other image (selected/cropped or otherwise not selected/cropped) can be communicated to the server (or remain on the portable computing device) for further processing.

Neutral network 508 can be used to analyze the visual representation of the speech data to determine an authenticity score of the speech data, or a set of authenticity scores, where individual authenticity scores can be associated with a segment of the image. The authenticity scores can be compared to authenticity thresholds. In this example, in the situation where an authenticity score satisfies an authenticity threshold, the speech segment associated with the authenticity score can be classified as authentic. In the situation where the authenticity score does not satisfy the authenticity threshold, the speech segment associated with the authenticity score can be classified as inauthentic. As shown, speech segments 510 that are authentic are associated with a check mark or other indicator of an authentic speech segment and speech segments 510 that are inauthentic are associated with x mark or other indicator of an inauthentic speech segment. In various embodiments, speech data, including segments of speech data, classified as authentic can correspond to an authenticity score of 1 and a classification of inauthentic can correspond to an authenticity score of 0. It should be noted that the provide values of the scores are example values, and any value can be used to denote authentic or otherwise.

In some embodiments, rather than classifying a segment as authentic or otherwise, the speech segments can be associated with respective authenticity scores or values. In any situation—classifying segments as authentic or otherwise, associating individual segments with an authenticity score, or a combination thereof, can be analyzed by authentication component 512 to make a determination of the authenticity of the speech data based on a combination of the authenticity scores and/or classifications. For example, a weighted combination of authenticity scores or classifications of the segments of the speech data can be used to determine whether the speech data, in its entirety, is authentic or otherwise.

Figure 6:
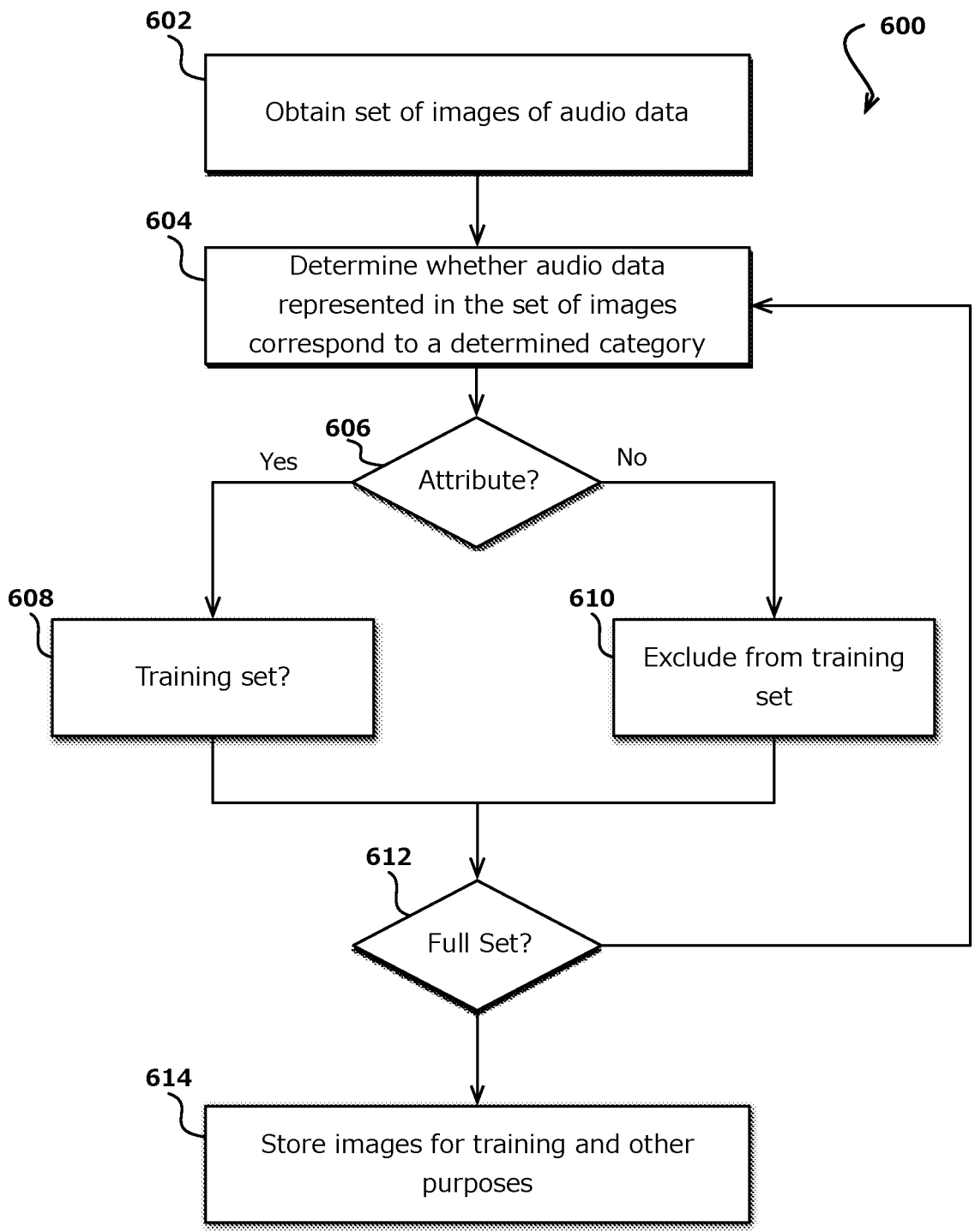
FIG. 6 illustrates an example process for determining training data that can be utilized in accordance with various embodiments.

FIG. 6 illustrates an example process 600 for determining training data that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of images of audio data can be obtained 602 for analysis. The images can be generated from one or more sources of audio data, such as from a provider of voice data, the Internet, an audio generator, users of an application or service, publicly available voice data (e.g., LibriVox, ASVSpoof15, etc.), and the like. In certain embodiments, the images can be from a catalog maintained by a service provider or a third party, or from multiple sources, among other such options. The images can include visual representations of analog and/or digital audio data.

For at least some of the images, such as a randomly selected subset or another such determination, such as the manner in which the image was obtained (e.g., generated, downloaded, etc.), data or other information associated with the images can be used to determine 604 whether audio data represented in those images correspond to a determined category and includes particular attributes, or types of attributes, for which a neural network is to be trained. This can include, for example, a specific category of authentic and/or inauthentic speech data. The data can be any data associated with an image, such as metadata for that image, database text mapped to that image, and the like.

If it is determined 606 that an image likely includes a representation of speech data exhibiting the attribute for a particular category, then that image can be added 608 to the training set. If not, the image can be excluded 610 from the training set. As mentioned elsewhere herein, in at least some embodiments, some of the images may be instead added to a testing image set or not added to any set but may have the attribute classification associated therewith.

If it is determined 612 that a full training set has been obtained, using any appropriate criterion as discussed or suggested herein, then the training set generation can complete, and the images can be stored 614 for training and other purposes. Otherwise, the process can continue until a full set is obtained, all of the relevant images are analyzed, or another stop condition is satisfied.

Figure 7:
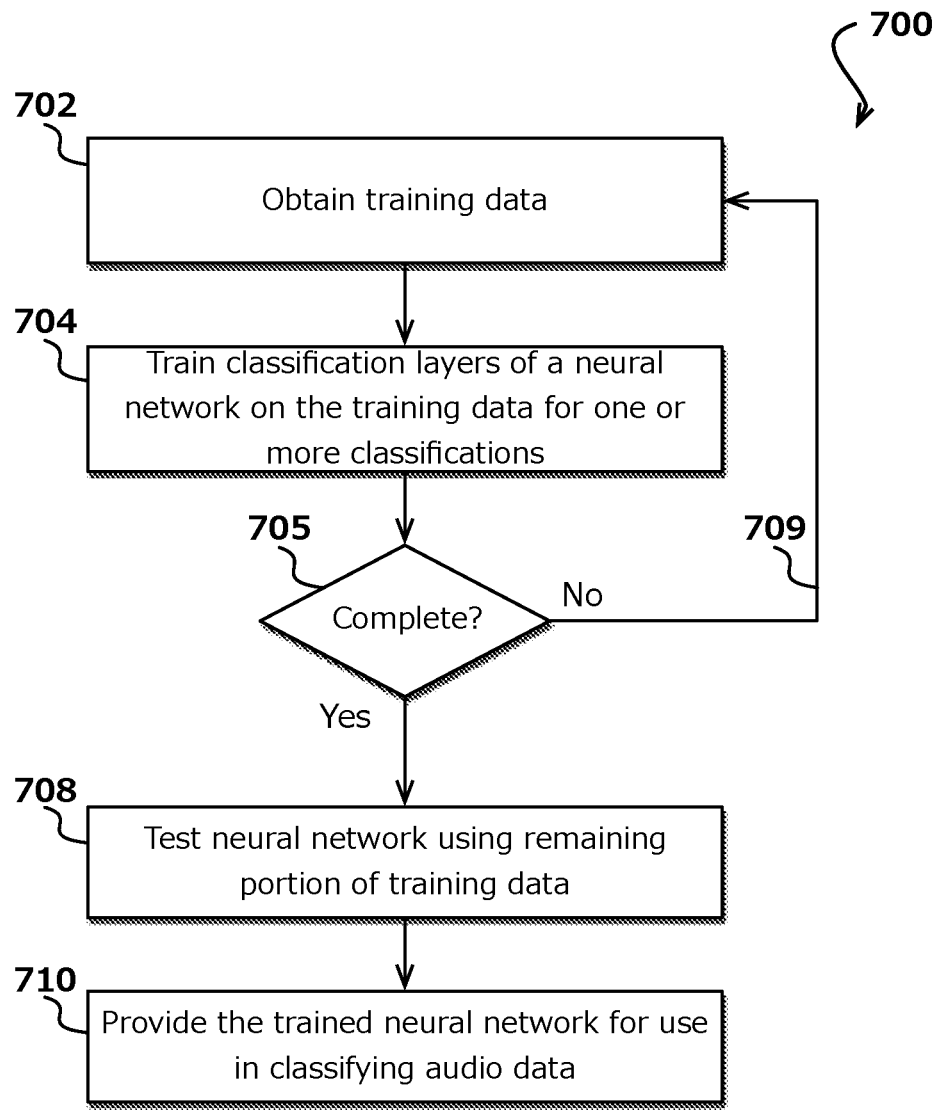
FIG. 7 illustrates an example process for training a model to identify audio data for a particular classification that can be utilized in accordance with various embodiments.

FIG. 7 illustrates an example process 700 for training a neural network that can be utilized in accordance with various embodiments. Once a set of training data is obtained 702, the training data can be provided as input to the network training process. The training data can include at least a first set of images and a second set of images that include visual representations of analog and/or digital audio data. The first set of images can include, for example, images of authentic speech data. The second set of images can include, for example, images of inauthentic speech data. In this example, the neural network can be trained for classifying audio data as authentic or otherwise. The classification layers of the neural network can be trained 704 on the first set of images and the second set of images to classify images of audio data for a particular classification. For example, speech data can be classified as authentic or inauthentic speech. Inauthentic speech can be associated with a category of inauthentic speech such as concatenative synthetic speech (Unit Selection), HMM-based parametric synthesis, deep neural network based parametric synthesis, recurrent neural network based parametric synthesis, end-to-end synthesizers including Google Wavenet, Tacotron2+wavenet, Tacrotron2+WaveRNN, etc.

In at least some embodiments there is one neural network trained for each category of speech data, with multiple types of classifications of that type of speech data being possible outcomes from the network.

If it is determined 705 that a stop condition has been met so that training should be completed, such as by processing the entire training set or reaching a determined confidence threshold, then the trained neural network can be provided to classify, for example, audio data represented in image data. As discussed herein, the network might first go through a process to test 708 using at least some of the image data classified with the attribute type from earlier steps of the process. If the training is not complete, then the training process can continue 709 until a trained model is obtained. Thereafter, the trained neural network can be provided 710 to classify audio data.

Figure 8:
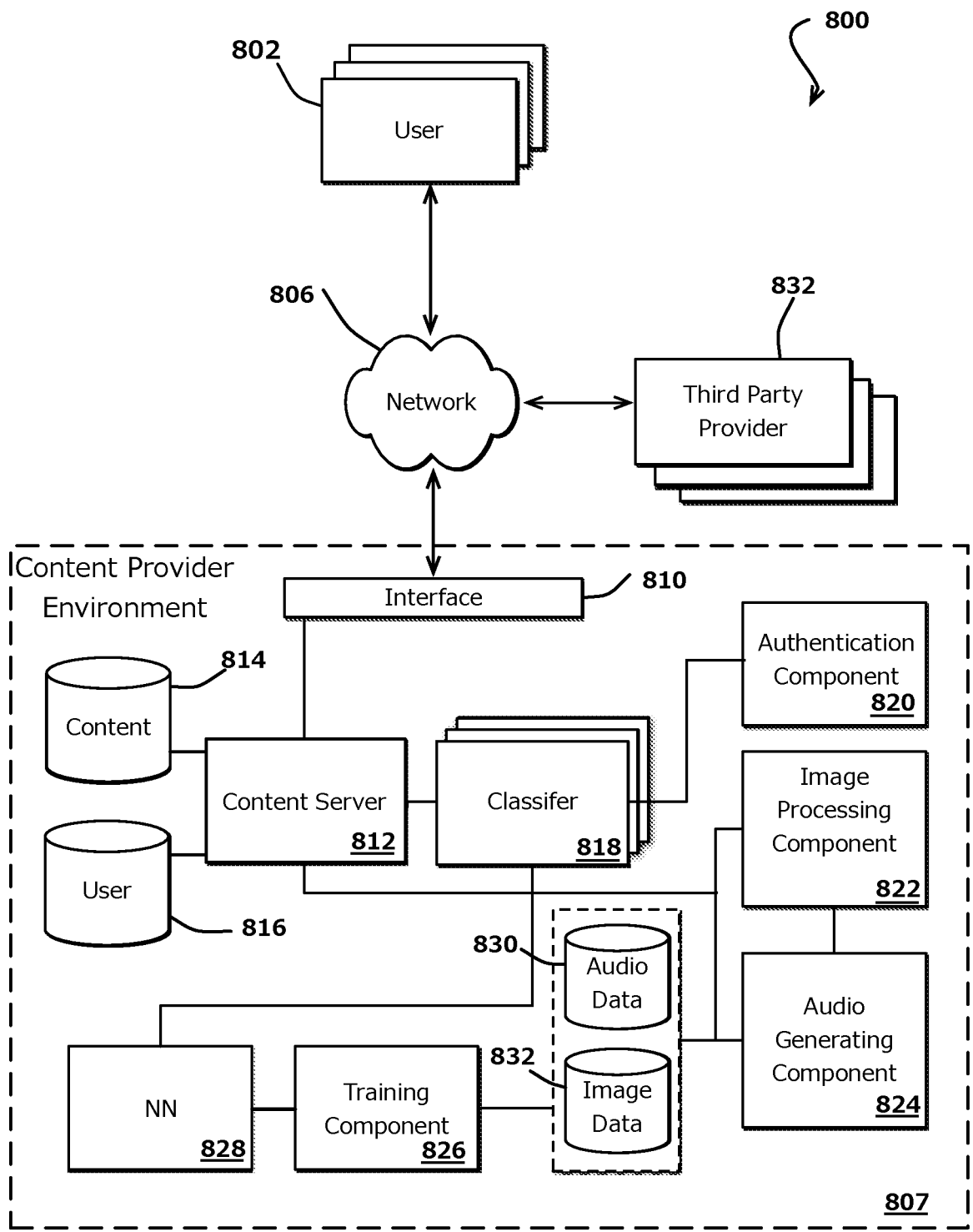
FIG. 8 illustrates an example environment in which aspects of the various embodiments can be implemented.

FIG. 8 illustrates an example environment 800 in which aspects of the various embodiments can be implemented. In this example, a user can utilize an application or interface, such as a browser, executing on a client device 802 to send requests for content over at least one network 806. In accordance with various embodiments, the request can include, or be associated with, audio data such as speech data. In various embodiments, the request can be on behalf of a user or customer of the user. The client device 802 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

In this example, the client device 802 is in communication with a content provider 807 via the at least one network 806. In accordance with various embodiments, content provider 807 can provide one or more services. For example, the content provider can provide audio authentication services, identity verification services, content, etc. The at least one network can include a wired and/or wireless network, as may include the Internet, a cellular network, a local area network (LAN), an Ethernet, an Intranet, and the like. The client device 802 may have varied local computing resources, such as may include central processing units and architectures, memory, mass storage, graphics processing units, communication network availability and bandwidth, etc.

The request can be received to an interface and/or networking layer 810 of the content provider 807. The interface and/or networking layer can include any of a number of components known or used for such purposes, as may include one or more routers, switches, load balancers, Web servers, application programming interfaces (APIs), and the like.

If the request is an authorization request for content, access, or otherwise, information for the request as well as information associated with the request can be directed to one or more content servers 812 or another component of the provider environment 807, which can obtain the content from a content data store 814 or other such repository to be sent back across the network(s) to the computing device. The server 812 can be any appropriate type of server or other such computing devices, as may include one or more application servers operable to process instructions provided by a user or database servers operable to process data stored in one or more data stores in response to a user request. In some embodiments, information for the request might also be compared against user data in a user data store 816 or other such location to determine, for example, whether the user has access rights to that content. This can include, for example, analyzing audio data associated with the request to determine whether the audio data is authentic.

For example, as shown in FIG. 8, the provider 807 can include classifier(s) 818, authentication component 820, image processing component 822, audio generating component 824, training component 826, neural network 828, although additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein.

Audio data can be obtained and stored in data store 830. The audio data can be obtained from third-party provider 832 of audio data, the Internet, audio generating component 824, users of an application or service, publicly available voice data (e.g., LibriVox, ASVSpoof15, etc.), and the like.

Image processing component 822 can include one or more processing components operable to process audio and image data. Image processing component 822 can generate visual representations of the audio data, which can be stored in image data store 832. The visual representations can include, for example, an image such as a spectrogram or other visual or electronic representation of the spectrum of the speech data.

For example, as part of a preprocessing process, image processing component 822 can implement one or more signal processing algorithms to adjust a sampling rate of audio data stored in data store 830, remove, alter, and/or add audio data, etc. Image processing component 822 can transform the audio data from the time domain into another domain, e.g., the frequency domain to generate one or more digital audio segments, where each segment can correspond to a determined or variable window of time. In various embodiments, image processing component 822 can generate a spectral representation of the audio data, focus on different aspects of the spectral representation (e.g., narrowband, wideband focus), select or crop regions of the image to remove irrelevant portions of the image and to highlight relevant portions, etc. The relevant regions can be binarized and stored in data store 832. Alternatively, in accordance with at least one embodiment, a grey scale image, color image or any other image (selected/cropped or otherwise not selected/cropped) can be generated and stored in data store 832.

The images can be designated as part of a training set for training neural network 828 or other machine learning-based approach using training component 826 for attributes associated with a category of audio or speech data (e.g., authentic, inauthentic speech categories). In various embodiments, the images can include visual representations of analog and/or digital audio data. The images in the set can be analyzed using a classification process or other such process to determine whether speech data represented in those images corresponds to a determined category and includes particular attributes, or types of attributes, for which a neural network is to be trained.

For example, training component 826 can perform the training on neural network 828 and provide the resulting results and/or trained classifiers or models for use in determining the appropriate classifications. An example of a trained model can be a trained speech authentication model. As mentioned, for NN-based approaches there can be images submitted that are classified by the type of audio data represented, while for GAN-based approaches a series of images may be submitted for training that may include metadata or other information useful in classifying audio data represented in each image.

In certain embodiments, training a neural network may involve significant use of computation resources and time, such that this may correspond to a preparatory step to classifying audio data requests and/or performed relatively infrequently with respect to authentication requests and/or according to a schedule. In accordance with various embodiments, each image in the set of training images can be associated with at least one classification for audio data represented in the image. According to some embodiments, training images and respective training audio labels can be located in a data store 832 that includes images of audio representations.

Training component 826 can utilize a training data set to train the neural network 828 that contains a combination of images. This set includes a variety of images of audio data focusing on different aspects of audio that can be useful for training the neural network for different classifications. As discussed, this can include training the neural network for different features of the audio data, including, for example, fundamental frequency, phase, features determined on the whole audio data, spectral magnitude, etc.

As further described, neural networks can include several learning layers in their architecture. These layers can include a region proposal layer configured to determine regions of an image that include types of audio data, a classification layer configured to determine a classification of audio data within regions, among other layers. Accordingly, approaches in accordance with various embodiments can attempt to train one or more neural networks or other machine learning algorithms for detecting and localizing audio data in images one or more phases. For example, in a first phase, the neural network can be trained on audio data that may include representations of authentic audio data. In a second phase, classification layers of the neural network can be fine-tuned and trained to classify audio data for a particular classification of inauthentic audio data, such as concatenative synthetic speech (Unit Selection), HMM-based parametric synthesis, deep neural network based parametric synthesis, recurrent neural network based parametric synthesis, endto-end synthesizers including Google Wavenet, Tacotron2+ wavenet, Tacotron2+WaveRNN, etc., or other such classification.

Once neural network 828 is trained, trained classifiers 818 can be used to classify audio data from an image of the audio data, and the classified audio data can be utilized by authentication component 820 as part of an authentication process.

In certain embodiments, a neural network trained on known acoustic features of inauthentic speech data can be used with the various approaches described as a preliminary or verification step in determining an authentication of audio data. For example, images of acoustic features for different types of inauthentic speech can be used to train classification layers of neural network 828. Thereafter, the trained classification layers or classifiers 818 can be used to analyze audio data to extract features from the input audio data. The extracted features can be compared against images or features (e.g., feature vectors) of known acoustic features of inauthentic speech data using an image matching process to identify images with matching features, feature points, feature vectors, or other such aspects, and an appropriate confidence score generated based at least in part upon the match or similarity.

As a preliminary step, if a significant portion of the input audio data is represented in image data of inauthentic audio data, or at least a threshold confidence score is met, approaches described herein may be skipped, the input audio data classified as inauthentic, and the classification or at least the confidence score made available to authentication component 820. In the situation where the threshold confidence is not met, approaches described herein may be utilized to classify the input audio data. As a verification step, the input audio data can be analyzed in accordance with approaches described herein. Based on the results, the input audio data can be analyzed using classification layers trained on acoustic features. The results of the two approaches can be weighted and combined, for example, and made available to authentication component 820.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the message service. For example, the system can include various modules and components combined on a single device, multiple instances of a single module or component, etc. In one specific, non-limiting embodiment, classifier component(s) 818, image processing component 822, audio generating component 824, training component 826, and neural network 828, can execute on one device and content server 812 can execute on another device, and authentication component can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 9:
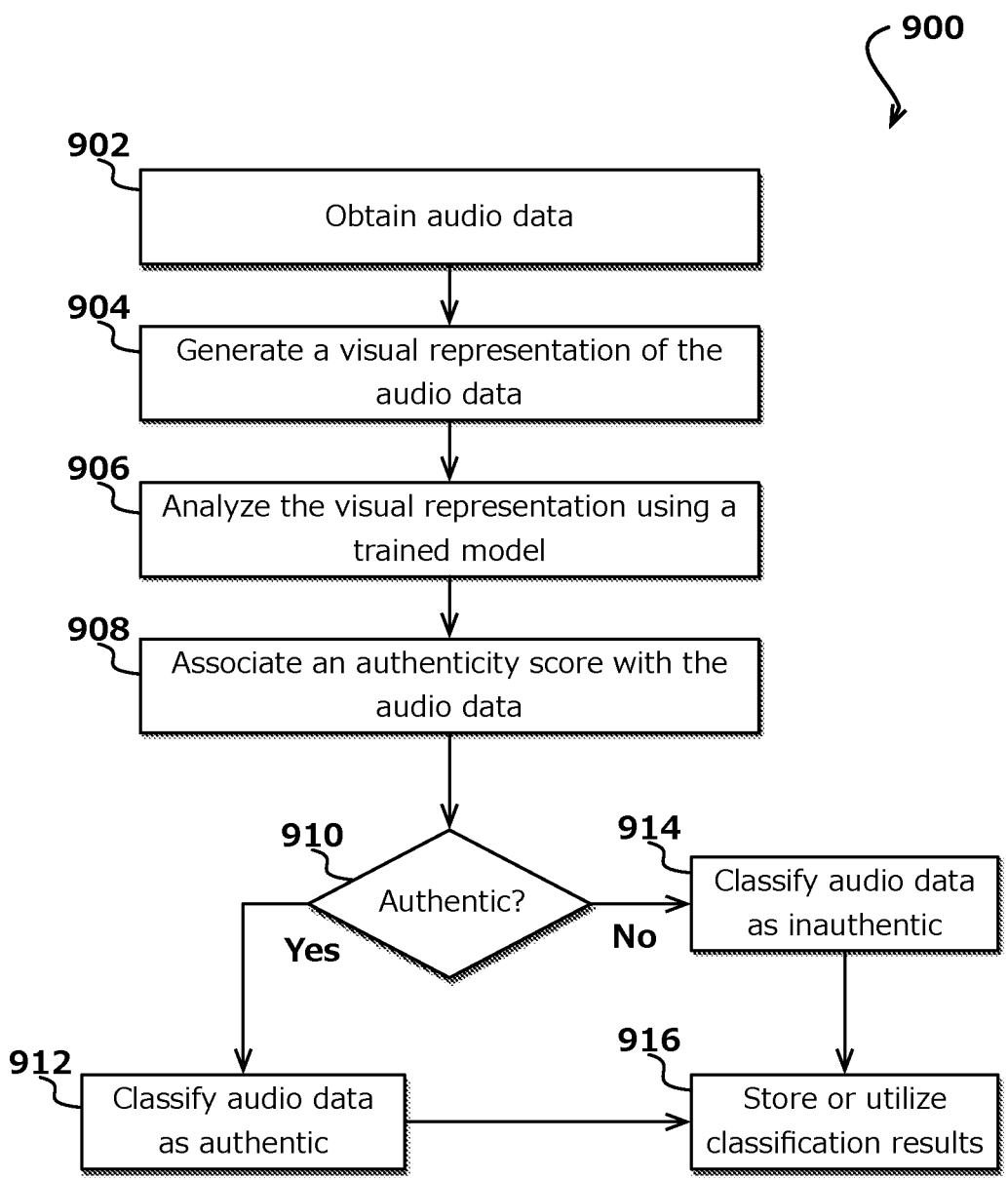
FIG. 9 illustrates an example process for classifying audio data in accordance with various embodiments.

FIG. 9 illustrates an example process 900 for classifying audio data in accordance with various embodiments. In this example, audio data, including, for example, speech data can be obtained 902. The audio data can be captured by a computing device, downloaded, or otherwise acquired. A visual representation of the audio data can be generated 904. The visual representation can include, for example, an image such as a spectrogram or other visual or electronic representation of the audio data. In various embodiments, before processing the image, the audio data and/or image may undergo various preprocessing techniques as described herein. The visual representation of the audio data can be analyzed 906 using a trained model such as a trained neural network to associate 908 an authenticity or other confidence score with the audio data. A determination 910 can be made whether the audio data is authentic. For example, the authenticity score can be compared to the authenticity threshold. In the situation where an authenticity score satisfies an authenticity threshold, the audio data can be classified 912 as authentic audio data. In the situation where the authenticity score does not satisfy the authenticity threshold, the audio data can be classified 914 as inauthentic audio data. Thereafter, results of the classification can be stored 916 or utilized in at least one other process, for example, an authentication process.

Figure 10:
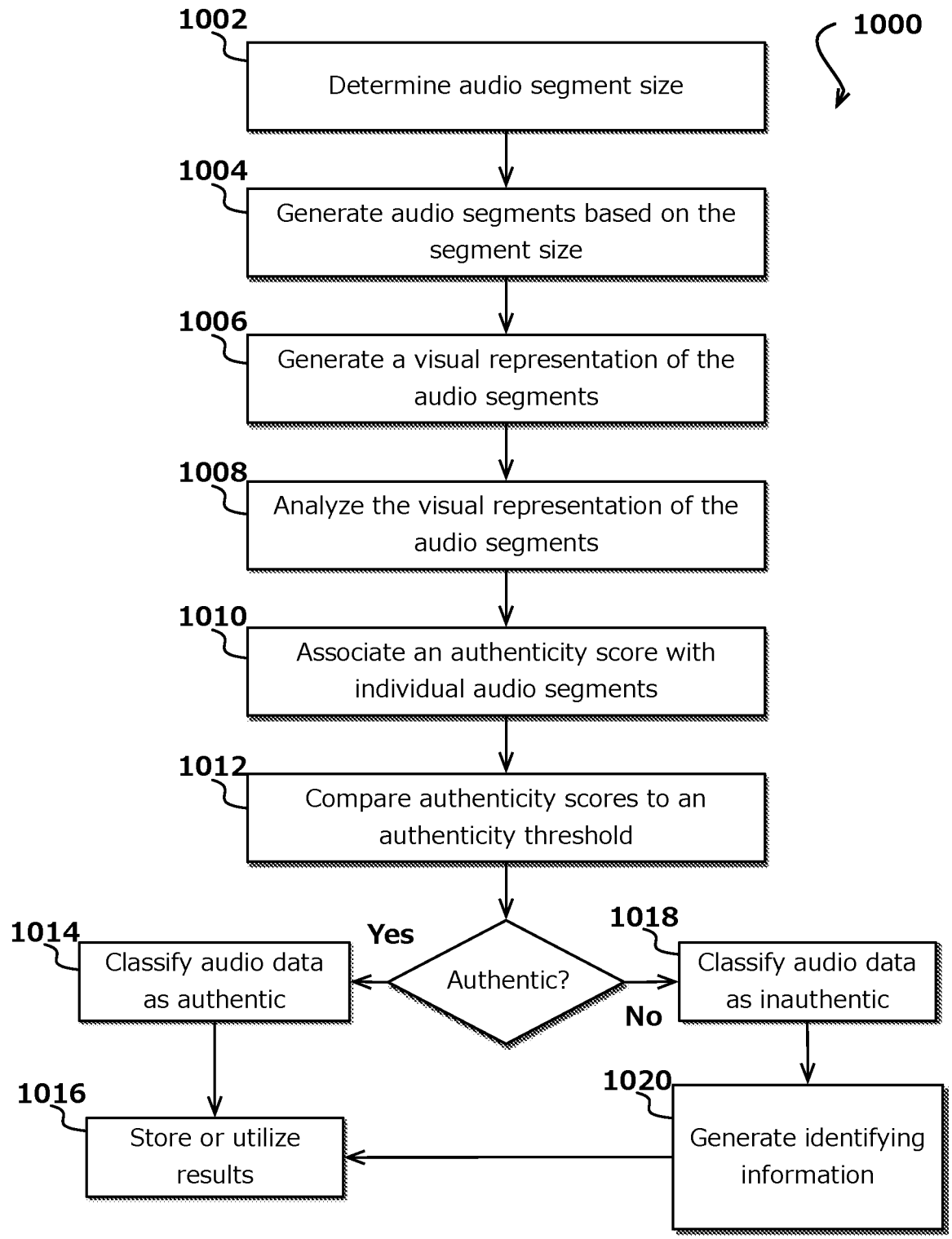
FIG. 10 illustrates an example process for classifying at least a portion of audio data in accordance with various embodiments.

FIG. 10 illustrates an example process 1000 for classifying at least one portion of audio data in accordance with various embodiments. In this example, an audio segment size or window sampling size can be determined 1002. In accordance with various embodiments, determining the size of each window or segment can be accomplished in any number of ways. For example, fixed length windows can be used based at least in part on characteristics of human speech, such as the duration of certain phonemes. In various other embodiments, wavelet decomposition can be used to determine the size of each window segments. In some embodiments, certain detected amplitudes of the audio input signal can be used to segment the audio data. For example, detected amplitudes can be used to determine when something spoken begins and when something spoken ends, and the 'begin' and 'end' determination can be applied to segment the audio input signal. In another example, the audio segments can be identified by a frequency distribution or other audio data identifier. For example, each of the windows of time can correspond to a respective portion of the audio data, where the size of individual windows can be based on a duration a vowel phoneme, other phonemes, or any other unit of language. The input audio data can be sampled to generate 1004 audio segments suitable for further processing based on the segment size. In some embodiments, computer-readable instructions may be generated to identify the audio segments. The individual audio segments can be analyzed to classify the audio data and/or individual audio segments. For example, a visual representation of the audio segments can be generated 1006. As described, the visual representation can include, for example, an image such as a spectrogram or other visual or electronic representation of the spectrum of the audio data segments. The visual representations of the audio segments can be analyzed 1008 using a trained network to associate 1010 an authenticity score with individual audio segments. In an embodiment, the authenticity scores can be compared 1012 to authenticity thresholds. In the situation where an authenticity score satisfies an authenticity threshold, the audio segment can be classified 1014 as authentic audio data (e.g., authentic speech data), and the results can be stored and/or utilized 1016 in one or more other processes, such as a context verification system that can identify a change in intention represented in audio data based on a category of, and/or a location of, inauthentic speech. For example, one or more speech context or intention analyzer algorithms can be used to determine intentions represented in speech data at one or more places in the speech data. A determination can be made whether there was a change in intention at a location associated with the inauthentic speech. In an embodiment, a change in intention can be detected when a change in intention changes at or near a location in the speech data associated with inauthentic speech.

In the situation where the authenticity score does not satisfy the authenticity threshold, the audio segment can be classified 1018 as inauthentic, and identifying information can be generated 1020. The information can include a label identifying a type of inauthentic speech location information that can be to locate specific sections of the audio data that includes authentic and/or inauthentic speech. The classification and information can be stored and/or utilized 1016 in one or more other processes.

Figure 11:
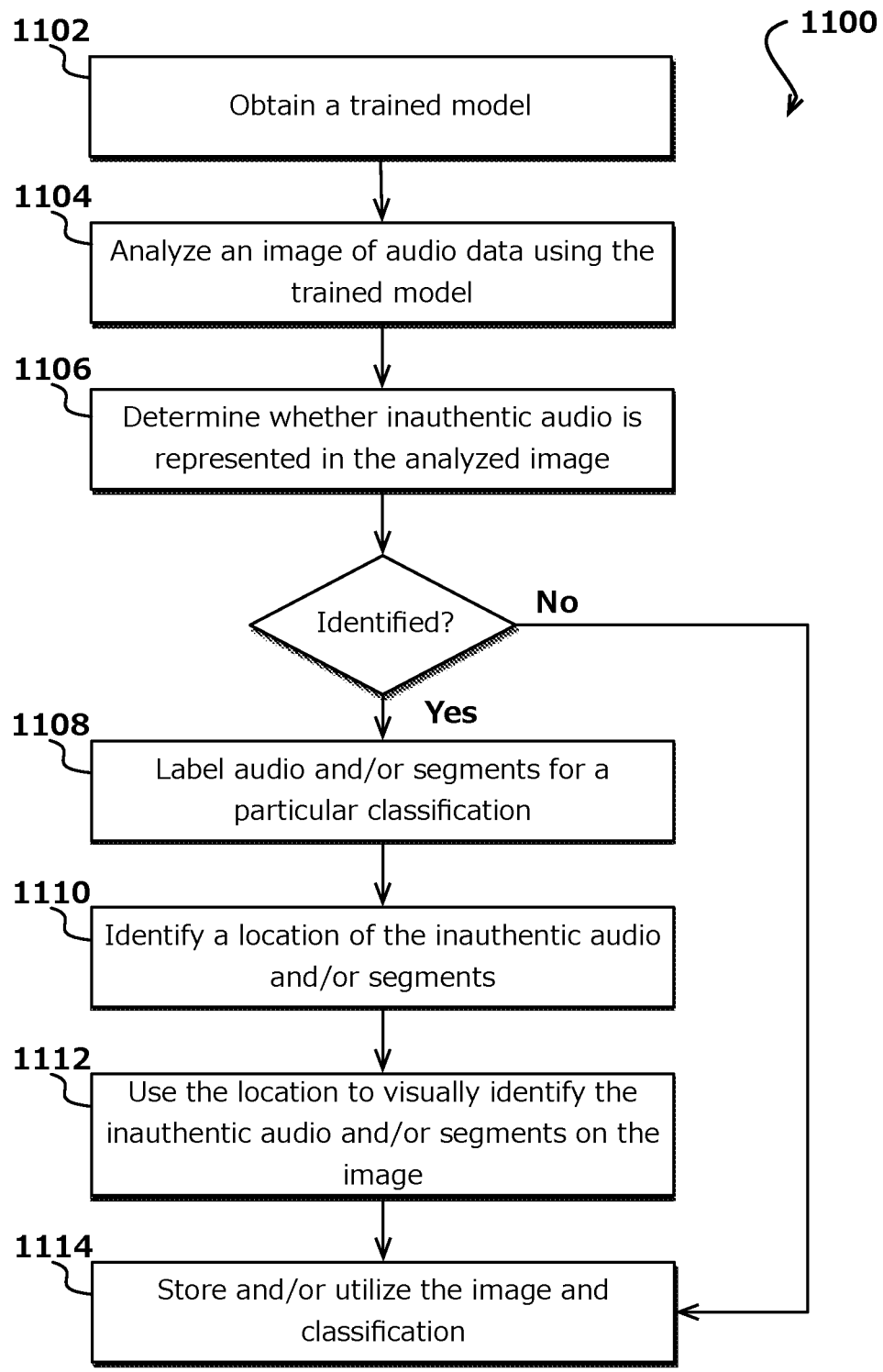
FIG. 11 illustrates an example process for classifying at least one portion of audio data in accordance with an embodiment.

FIG. 11 illustrates an example process 1100 for classifying at least one portion of audio data in accordance with an embodiment. In this example, a trained model is obtained 1102. An example of a trained model is an audio classification model, speech classification model, or other such model. The trained model can be configured to determine an authenticity score for audio data including segments of audio data represented in an image. For example, the image and/or segments of the image of the audio data can be analyzed 1104 using the trained model. For individual segments, a determination 1106 can be made whether inauthentic speech is represented in the image. In the situation where the audio data is authentic, the classification, image, and other information associated with the audio data described herein can be stored and/or utilized 1114 in at least one other process. In the situation where inauthentic speech is identified, the audio data and/or inauthentic segments can be labeled 1108 for a particular classification as determined by at least the trained model. Information for a location of the identified audio data can be identified 1110, and the information can be used 1112 to visually identify a segment of inauthentic speech on the image of the audio data. Thereafter, the image, classifications, and localization information (e.g., location information) can be stored and/or utilized 1114 in other processes.

Figure 12:
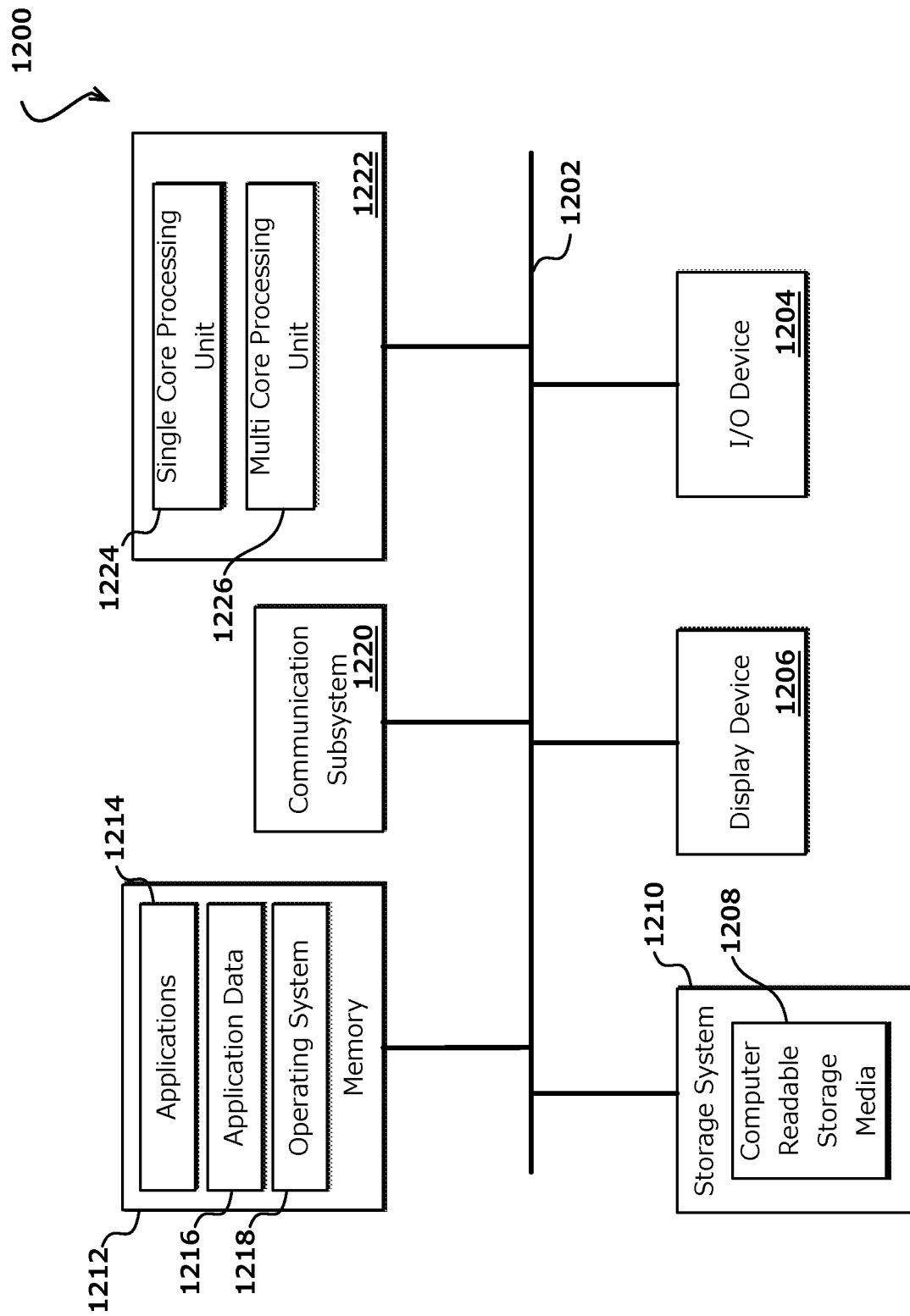
FIG. 12 illustrates example components of a computing device.

FIG. 12 shows an example computer system 1200, in accordance with various embodiments. In various embodiments, computer system 1200 may be used to implement any of the systems, devices, or methods described herein. In some embodiments, computer system 1200 may correspond to any of the various devices described herein, including, but not limited, to mobile devices, tablet computing devices, wearable devices, personal or laptop computers, vehicle-based computing devices, or other devices or systems described herein. As shown in FIG. 12, computer system 1200 can include various subsystems connected by a bus 1202. The subsystems may include an I/O device subsystem 1204, a display device subsystem 1206, and a storage subsystem 1210 including one or more computer-readable storage media 1208. The subsystems may also include a memory subsystem 1212, a communication subsystem 1220, and a processing subsystem 1222.

In system 1200, bus 1202 facilitates communication between the various subsystems. Although a single bus 1202 is shown, alternative bus configurations may also be used. Bus 1202 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1202 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1204 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1204 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1200 may include a display device subsystem 1206. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1206 may include a controller and/or interface for controlling and/or communicating with an external display, such as any of the above-mentioned display technologies.

As shown in FIG. 12, system 1200 may include storage subsystem 1210 including various computer-readable storage media 1208, such as hard disk drives, solid-state drives (including RAM-based and/or flash-based SSDs), or other storage devices. In various embodiments, computer-readable storage media 1208 can be configured to store software, including programs, code, or other instructions, that is executable by a processor to provide the functionality described herein. In some embodiments, storage system 1210 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1210 can include a media reader, card reader, or other storage interfaces to communicate with one or more external and/or removable storage devices. In various embodiments, computer-readable storage media 1208 can include any appropriate storage medium or combination of storage media. For example, computer-readable storage media 1208 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1212 can include various types of memory, including RAM, ROM, flash memory, or other memory. Memory 1212 can include SRAM (static RAM) or DRAM (dynamic RAM). In some embodiments, memory 1212 can include a BIOS (basic input/output system) or other firmware configured to manage initialization of various components during, e.g., startup. As shown in FIG. 12, memory 1212 can include applications 1214 and application data 1216. Applications 1214 may include programs, code, or other instructions, that can be executed by a processor. Applications 1214 can include various applications such as browser clients, campaign management applications, data management applications, and any other application. Application data 1216 can include any data produced and/or consumed by applications 1214. Memory 1212 can additionally include operating system 1218, such as macOS®, Windows®, Linux®, various UNIX® or UNIX- or Linux-based operating systems, or other operating systems.

System 1200 can also include a communication subsystem 1220 configured to facilitate communication between system 1200 and various external computer systems and/or networks (such as the Internet, a local area network (LAN), a wide area network (WAN), a mobile network, or any other network). Communication subsystem 1220 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1220 can include hardware and/or software components to communicate with satellite-based or ground-based location services, such as GPS (global positioning system). In some embodiments, communication subsystem 1220 may include, or interface with, various hardware or software sensors. The sensors may be configured to provide continuous or and/or periodic data or data streams to a computer system through communication subsystem 1220.

As shown in FIG. 12, processing system 1222 can include one or more processors or other devices operable to control computing system 1200. Such processors can include single-core processors 1224, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1222, such as processors 1224 and 1226, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
at least one computing processor; and
memory including instructions that, when executed by the at least one computing processor, enable the computing system to:
obtain voice data from a provider of voice data;
analyze the voice data to generate an image that includes a visual representation of the voice data;
use a trained model to analyze the image to determine classification information;
compare the classification information to stored classification to determine a plurality of similarity scores, a similarity score quantifying a level of similarity of the voice data represented in the image to stored representations of voice data;
identify an identifier corresponding to an identity of a speaker of the voice data based on the plurality of similarity scores; and
use the identifier to generate information about the identity of the speaker.

2. The computing system of claim 1, wherein the classification information includes a confidence score quantifying a likelihood that the voice data represented in the image is authentic.

3. The computing system of claim 1, wherein the voice data is obtained from at least one provider from a plurality of providers, the plurality of providers including radio content providers, video content providers, audio content providers, television content providers, or live performance content providers, and wherein at least a portion of the voice data is generated from one of a human, an electronic device, or a mechanical device.

4. The computing system of claim 1, wherein the instructions when executed by the at least one computing processor further enable the computing system to:
determine whether the voice data is authorized for use by the provider.

5. The computing system of claim 4, wherein the instructions when executed by the at least one computing processor further enable the computing system to:
compare the identifier to a stored group of identifiers;
determine the identifier matches a stored identifier from the stored group of identifiers to identify a matched identifier; and
determine whether the matched identifier is authorized for use by the provider.

6. The computing system of claim 4, wherein the instructions when executed by the at least one computing processor further enable the computing system to:
compare the visual representation of the voice data to stored representations of voice data,
determine the visual representation of the voice data matches one of the stored representations of voice data to identify matched voice data; and
determine whether the matched voice data is authorized for use by the provider.

7. The computing system of claim 1, wherein the instructions when executed by the at least one computing processor further enable the computing system to:
present the information.

8. A method, comprising:
obtain audio data;
analyze the audio data to generate an image that includes a visual representation of the audio data;
use a trained model to analyze the image to determine a confidence score, the confidence score quantifying a likelihood that audio data represented in the image is authentic,
compare the confidence score to an authenticity threshold; and
determine whether the audio data is authentic based on at least the confidence score and the authenticity threshold.

9. The method of claim 8, further comprising:
determine the confidence score fails to satisfy the authenticity threshold; and
classify the audio data as inauthentic.

10. The method of claim 8, further comprising:
determine classification information, the classification information associated with an identifier that identifies a speaker of the audio data; and
generate information for one of a provider of the audio data or an identity of the speaker.

11. The method of claim 10, further comprising:
present the information.

12. The method of claim 10, further comprising:
determine whether the audio data is authorized for use by the provider.

13. The method of claim 12, further comprising:
compare the identifier to a stored group of identifiers,
determine the identifier matches an identifier from the stored group of identifiers to identify a matched identifier; and
determine whether the matched identifier is authorized for use by the provider.

14. The method of claim 8, further comprising:
compare the visual representation of the audio data to stored representations of audio data,
determine the visual representation of the audio data matches one of the stored representations of audio data to identify matched audio data; and
determine whether the matched audio data is authorized for use by a provider of the audio data.

15. The method of claim 8, further comprising:
determine a first intention for subject matter included in the audio data;
identify a location of an inauthentic audio segment of the audio data; and
determine a change from the first intention to a second intention after the location of the inauthentic audio segment for the subject matter.

16. The method of claim 15, further comprising:
generate information for presenting the change.

17. A non-transitory computer readable storage medium storing one or more sequences of instructions executable by one or more processors to perform a set of operations comprising:
  obtain voice data from a provider of voice data;
  analyze the voice data to generate an image that includes a visual representation of the voice data;
  use a trained model to analyze the image to determine classification information;
  compare the classification information to stored classification to determine a plurality of similarity scores, a similarity score quantifying a level of similarity of the voice data represented in the image to stored representations of voice data;
  identify an identifier corresponding to an identity of a speaker of the voice data based on the plurality of similarity scores; and
  use the identifier to generate information about the identity of the speaker.

18. The non-transitory computer readable storage medium of claim 17, further comprising instructions executed by the one or more processors to perform the operations of:
  compare the identifier to a stored group of identifiers;
  determine the identifier matches an identifier from the stored group of identifiers to identify a matched identifier; and
  determine whether the matched identifier is authorized for use by the provider.

19. The non-transitory computer readable storage medium of claim 17, further comprising instructions executed by the one or more processors to perform the operations of:
  compare the visual representation of the voice data to stored representations of voice data,
  determine the visual representation of the voice data matches one of the stored representations of voice data to identify matched voice data; and
  determine whether the matched voice data is authorized for use by the provider.

20. The non-transitory computer readable storage medium of claim 17, further comprising instructions executed by the one or more processors to perform the operations of:
  determine a first intention for subject matter included in the voice data;
  identify a location of an inauthentic audio segment of the voice data;
  determine a change from the first intention to a second intention after the location of the inauthentic audio segment for the subject matter; and
  generate information for presenting the change.

* * * * *